UNITED STATES PATENT OFFICE.

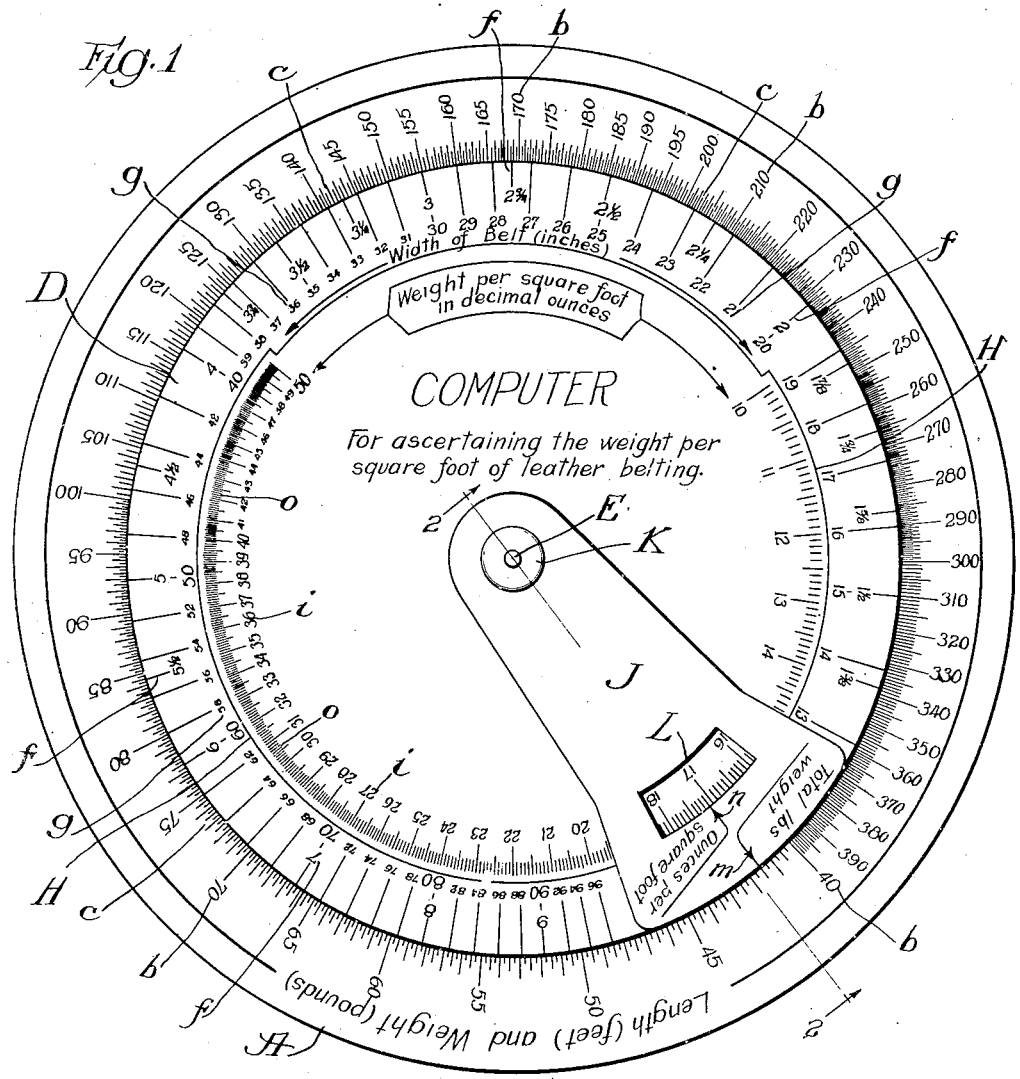
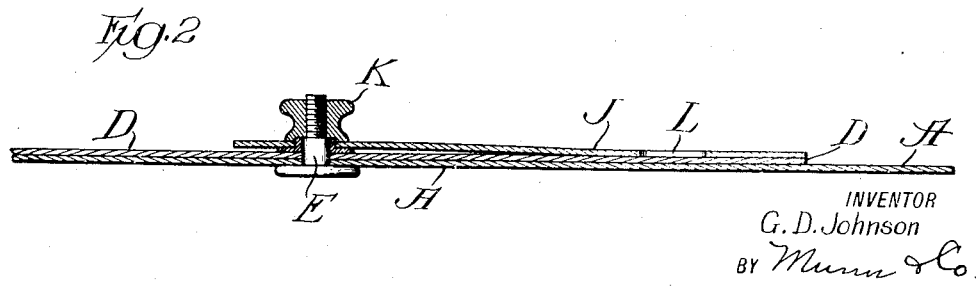

GEORGE DAVID JOHNSON, OF CHICAGO, ILLINOIS; LOUISE JOHNSON ADMINISTRATRIX OF SAID GEORGE DAVID JOHNSON, DECEASED.

COMPUTING DEVICE.

1,405,847.   Specification of Letters Patent.   Patented Feb. 7, 1922.

Application filed March 1, 1920. Serial No. 362,316.

*To all whom it may concern:*

Be it known that I, GEORGE D. JOHNSON, a citizen of the United States, and a resident of Chicago, in the county of Cook and State of Illinois, have invented a new and useful Improvement in Computing Devices, of which the following is a full, clear, and exact description.

My invention relates to improvements in devices for computing weight per square foot of leather belting, and it consists in the combinations, constructions, and arrangements herein described and claimed.

An object of my invention is to provide a mechanical device comprising parts bearing scales having certain relations so that by setting certain parts at certain relative positions the weight per square foot of leather belting in a roll in decimal ounces, the total weight of the roll being known is indicated upon the device without the necessity of the use of additional calculating instruments and without mathematical computation.

A further object of my invention is to provide a device that is simple in operation and which takes up relatively little space so that it may be readily carried about and utilized in places where it would be impossible or at least burdensome to carry instruments of a more complex nature.

Other objects and advantages will appear in the following specification, and the novel features of the invention will be particularly pointed out in the appended claims.

My invention is illustrated in the accompanying drawings, forming part of this application, in which—

Fig. 1 is a face view of the device,

Fig. 2 is a sectional view of a part of the device along the line 2—2 of Fig. 1.

In carrying out my invention, I provide a circular base A having a scale $b$ circularly arranged around its outer edge. The unit of the scale $b$, which ranges from 40 to 399 inclusive, is 1 which is both the unit of length of a roll of belt in feet and the unit of total weight of a roll of belt in pounds. Fractions of units in the scale $b$ are denoted by spaced graduations $c$ between the lines denoting the multiples of the unit.

The title of the scale $b$, namely: length (feet) and weight (pounds) is marked upon the base A as indicated in Fig. 1 of the accompanying drawings.

A disk D is concentrically mounted to rotate around the pivot E which projects from the center of the base A. A scale $f$ is arranged around the outer edge of the disk D and ranges from 1 to 9¾ inclusive, the unit being ¼ of a linear inch. The scale $f$ denotes the width of belt in inches. A scale $g$ is concentrically arranged immediately within the scale $f$ and ranges from 10 to 96, the unit being 1 inch, and the scale $g$ also denoting the width of belt in inches. The scales $f$ and $g$ are marked as denoting the width of the belt in inches upon the face of the disk D, as shown in Fig. 1 of the accompanying drawings.

A circle H is the dividing line between the scale $g$ and an inner scale $i$ which is concentrically arranged with respect to the scales $g$ and $f$. The scale $i$ ranges from 10 to 50 inclusive and its unit is 1 decimal ounce. The scale $i$ is indicated by the descriptive title "weight per square foot in decimal ounces" upon the disk D, as shown in Fig. 1 of the accompanying drawings.

The title of the device and instructions for finding directions to operate the device may be marked upon the space around the central part of the disk D. An indicator arm J, which is a segment of a circle having the same radius as the circular disk D, is mounted to rotate upon the pivot E. A knurled nut K screws upon the threaded end of the pivot E to hold the indicator arm in a desired position with respect to the disk D and base A and also holds the disk D in a desired position with respect to the base A. The indicator arm J has an aperture L positioned as indicated in Fig. 1 of the accompanying drawings. It will be noted that this arrangement presents the figures of the scale $i$ to view, while the figures of the graduations of the scales $f$ and $g$ are concealed beneath the end of the indicator arm J. An arrow $n$ points inwardly to the scale $i$, while a similar arrow $m$ points outwardly toward the scale $b$ which is upon the base A. Directions for operating the device may be printed upon the back space of the base A, which is otherwise blank.

It will be noted that the scale $b$ consists of a series of figures increasing numerically and intended to be read clockwise. The scale $f$ and the scale $g$ are each intended to be read counterclockwise and the scale $i$ is adapted for reading clockwise.

From the foregoing description of the various parts of the device, the operation thereof may be readily understood. To ascertain the weight per square foot of the leather belting in a roll having a given total length and a given total weight, it is only necessary to turn the disk D until a figure in the scales $f$ or $g$ denoting the width of the belting registers with a figure in the scales $b$ denoting the total length in feet of the roll. The total weight of the roll is also known and the indicator arm J is turned until the arrow $m$ points to the total weight of the roll which is known. The arrow $n$ will then point to a figure in the scale $i$ which will be the weight per square foot of the belt in decimal ounces. For example, suppose it is desired to ascertain the weight per square foot of single leather belting 2¾ inches wide in a roll 168½ feet long. The total weight of the roll is known to be 41¼ pounds. The figure 2¾ of the scale $f$ is placed in registration with 168½ of the scale $b$. The indicator arm is now turned until the arrow $m$ points to 41¼ also in the scale $b$, since the scale $b$ indicates both length in feet and weight in pounds. The arrow $n$ will indicate the number in the scale $i$ which is the weight per square foot of the belt in decimal ounces and is found to be 17.1.

The computer provides a means whereby the weight per square foot in decimal ounces of single or double leather belt in any width up to 100 inches may be quickly and accurately determined without mathematical calculation. It is as simple an operation with the device to figure the weight per square foot of one million feet weighing one million pounds as it would be to figure a length of one foot weighing one pound.

The scale $b$ ranges from 40 to 399 inclusive but by using multiples of the unit of the scale $b$ any required length and weight can be figured. Leather belting is put up and manufactured in rolls of varying lengths. The total length of the belting in each roll and the weight of the roll is known. The leather belting is sold by weight. It has heretofore been necessary to calculate mathematically the weight per square foot. For example, to ascertain the weight per square foot of single belting 2¾ inches wide in a roll of 168½ feet long, it would be necessary to multiply 168½ by 2¾ and then divide the product by 12 in order to determine the number of square feet in the roll. It would then be necessary to divide the weight of the total, which is known to be 41¼ pounds by the result obtained in order to determine the weight per square foot in pounds and it would further be necessary to reduce the product last obtained to ascertain the weight per square foot in decimal ounces, which is the unit commonly employed in the sale of leather belting.

It will be obvious that considerable labor is required in computing the weight per square foot in decimal ounces, since the output of a factory will comprise a large number of rolls of leather daily. There is also always the possibility of error when the results are determined by mathematical calculation. The employment of the device will therefore result in a great saving of both time and money and an accurate result will be obtained in every instance.

It will be observed that fractions of the unit of the scale $i$ are indicated by spaced graduations in order to permit results to be obtained with more exactness.

I claim:

1. A calculating device comprising a circular base having a circular scale delineated thereon about its outer edge, a second circular disk concentrically and rotatively mounted upon said circular base and having a diameter equal to that of the inner diameter of said first named circular scale, said second named circular disk having a scale delineated thereon about its outer edge and having an inner circular scale delineated thereon and spaced from the scale about its outer edge, said scales having graduations arranged for registry, and an indicator arm mounted for rotation about the common axis of said circular base and said circular disk and being arranged to indicate radially registering graduations representing correlated values in said first named scale and said last named scale and to cover the intervening segmental portion of the second named scale.

2. A calculating device comprising a circular base having a circular scale delineated thereon about its outer edge, a second circular disk concentrically and rotatively mounted upon said circular base and having a diameter equal to that of the inner diameter of said first named circular scale, said second named circular disk having a scale delineated thereon about its outer edge and having an inner circular scale delineated thereon and spaced from the scale about its outer edge, said scales having graduations arranged for registry, and an indicator arm mounted for rotation about the common axis of said circular base and circular disk, said indicator arm being a segment of a circle having the same radius as the second named circular disk and being formed with an aperture therethrough spaced from the outer end thereof to uncover during a complete revolution thereof the last named scale, and to simultaneously cover the second named scale, said indicator arm also being provided with an index at its outer end for indicating a selected graduation in the scale on the circular base and with a radially alined index for indicating a result in the inner scale on the second named disk.

GEORGE DAVID JOHNSON.